US005086290A

United States Patent [19]

Murray et al.

[11] Patent Number: 5,086,290

[45] Date of Patent: Feb. 4, 1992

[54] MOBILE PERIMETER MONITORING SYSTEM

[76] Inventors: Shawn G. Murray, 1543 NE. 52nd Ave., Portland, Oreg. 97213; Mark A. Hawes, 3314 SW. 125th Ave., Beaverton, Oreg. 97005

[21] Appl. No.: 490,282

[22] Filed: Mar. 8, 1990

[51] Int. Cl.[5] .......................... G08B 1/08; H04Q 7/00

[52] U.S. Cl. .................................... 340/539; 340/531; 340/573; 455/9; 455/67; 455/229

[58] Field of Search ............... 340/539, 531, 506, 572, 340/573; 455/9, 31, 67, 229

[56] References Cited

U.S. PATENT DOCUMENTS

| | | | |
|---|---|---|---|
| 4,101,872 | 7/1978 | Pappas | 340/539 |
| 4,598,272 | 7/1986 | Cox | 340/539 |
| 4,633,231 | 12/1986 | Kilian | 340/539 |
| 4,675,656 | 6/1987 | Narcisse | 340/539 |
| 4,777,478 | 10/1988 | Hirsch et al. | 340/539 |
| 4,785,291 | 11/1988 | Hawthorne | 340/539 |
| 4,833,452 | 5/1989 | Currier | 340/539 |
| 4,853,692 | 8/1989 | Wolk et al. | 340/539 |
| 4,871,997 | 10/1989 | Adriaenssens et al. | 340/539 |

*Primary Examiner*—Donnie L. Crosland

*Attorney, Agent, or Firm*—Chernoff, Vilhauer, McClung & Stenzel

[57] ABSTRACT

A mobile perimeter monitoring system includes a battery powder transmitter adapted to be placed upon the person to be monitored while the system user carries a receiver. The receiver responds to a code transmitted by the transmitter and provides an in-range or out-of-range indication depending upon whether the receiver is within the effective range of the transmitter or outside of its effective range. An adjustment on the receiver allows the user to adjust the effective range of the system for varying environments. The receiver may be operated in an in-range mode or an out-of-range mode to provide both perimeter monitoring capability and the ability to track a transmitter if its moves outside the perimeter.

6 Claims, 2 Drawing Sheets

MOBILE PERIMETER MONITORING SYSTEM

BACKGROUND OF THE INVENTION

The following invention relates to a mobile perimeter monitoring system and in particular relates to a two-station transmission system whereby the range between a fixed or mobile transmitter and a fixed or mobile receiver may be continuously monitored.

The adult supervision of young children can become a complicated task when the adult supervisor is busy with other chores and/or has a number of persons in his or her care. Children are, by their nature, curious, and frequently wander off to explore or become lost. For example, it is sometimes difficult for parents to monitor the whereabouts of their children in a large and crowded area such as a shopping mall. Children may be given instructions to stay in a certain area, but sometimes the instructions are not followed.

Some of these same concerns are shared by pet owners who would like to know, at least within certain limits, the whereabouts of pets. Dogs and cats, like children, become curious or distracted and frequently wander beyond their normal perimeters. In addition, there are safety applications where it would be useful to know the locations of individuals such as skiers, hikers or hunters.

In the past, transmitter/receiver combinations have been available whereby a transmitter carried by a child or pet continuously transmits a signal to the receiver. The transmitter is designed to have a fixed transmission range, and when it moves outside of that transmission range, an alarm at the receiver sounds. The devices that have been heretofore available are only partially useful for this purpose and have numerous drawbacks. First, these devices have had but a fixed transmission range which is set by the manufacturer. For example, if the manufacturer decides that the range will be one-quarter mile, that range will have to suffice under all circumstances. However, in certain circumstances the parent might wish that the range be set lower so that the effective perimeter could be limited to a much shorter range. Also, if multiple transmitters are used, it may become impossible to know whether one of the transmitters has moved outside of the perimeter since other transmitters within the perimeter may prevent the alarm from going off. Since the transmission frequencies available for this type of device are limited and comprise a very narrow FM band, the possibility for adjacent transmitters to interfere with one another is very high. Finally, tracking a lost child can be difficult and can consume the battery power of the receiver because the alarm is activated whenever the child is out of range.

SUMMARY OF THE PRESENT INVENTION

These problems and others are solved by the present invention which is a two unit system comprising a transmitter and receiver wherein a mobile transmitter periodically transmits a data signal to the receiver which processes the data signal and provides an alarm function depending upon whether the transmitter is within range or out of range of the receiver. The receiver may include a control for varying the sensitivity of the receiver which determines the effective perimeter and, hence, the range of the mobile transmitter and receiver combination.

The receiver may also include a mode control for operating it as either an in-range receiver or an out-of-range receiver. In the out-of-range monitoring mode an alarm will be generated whenever the mobile transmitter moves beyond its effective range as determined by the receiver's sensitivity control. For example, in a shopping mall environment the sensitivity might be set at 40 feet and the out-of-range mode may be chosen. In this situation an alarm will be generated if the mobile transmitter moves farther away from the receiver than 40 feet. In the in-range a tracking mode no alarm is generated until the receiver moves within the designated effective range of the transmitter which makes it more useful for tracking a lost person or pet.

Each transmitter has an encoder which generates a unique coded data signal so that false alarms will not be triggered by nearby FM transmission sources or other units.

In order to conserve battery power at the transmitter, the duty cycle is fairly low. For example, the data pulse may be transmitted for 40 milliseconds every 5 seconds which means that most of the time the transmitter is quiescent. The low duty cycle provides another benefit in addition to conserving battery power. With a low duty cycle it is statistically unlikely that two adjacent transmitters will transmit data at the same time. Thus signals from adjacent systems, even though both are using the same frequency, will not interfere because the signals will be interleaved timewise among each other. This permits a weak far away signal to be received even in the presence of a nearby strong signal.

In order to operate the alarm circuitry with data signals having a low duty cycle, a time delay or integrator circuit may be used on the receiver which maintains the alarm circuit in a predetermined state, either on or off according to the mode of operation, as long as a data pulse is received within the duty cycle period.

Additionally, the transmitters may include a duty cycle adjustment switch which further conserves battery power and provides an indication that the transmitter has become separated from the child. A latching switch, which may be activated by a clamp holding the transmitter to the child's clothing, changes the duty cycle from a low duty cycle to a very low duty cycle if the unit is removed. Thus, in the tracking mode which is used for tracking a child who has become lost, once the receiver moves within range of the transmitter, the very long period between alarm indications will signal that the transmitter is no longer on the child's person. This can be accomplished by arranging the clamp so that if it is removed the duty cycle switch permanently latches.

It is a primary object of this invention to provide a mobile perimeter monitoring system which can be used at a variety of perimeter ranges for both monitoring and tracking.

A further object of this invention is to provide a mobile transmitter and receiver range monitoring and tracking system which will be relatively immune from interference from adjacent systems or spurious RF sources.

A still further object of this invention is to provide a battery powered receiver/transmitter monitoring and tracking system that will operate for long periods of time without the need for replacement of batteries.

The foregoing and other objectives, features, and advantages of the invention will be more readily description of the invention, taken in conjunction with the accompanying drawings.

DETAILED DESCRIPTION OF THE INVENTION

Figure 1:
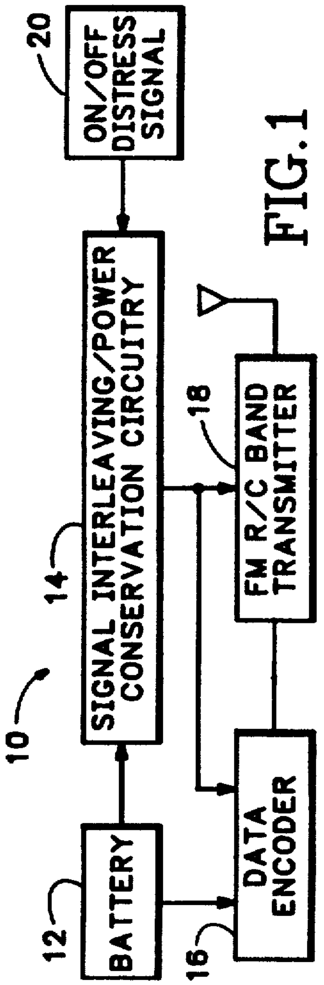
FIG. 1 is a block schematic diagram of a transmitter circuit constructed according to the present invention.

A transmitter circuit 10 as shown in FIG. 1 is a mobile transmitter and as such includes a battery 12 which supplies power to signal interleaving/power conservation circuitry 14 and data encoder 16. Both the encoder and the signal interleaving/power conservation circuitry are connected to an FM R/C band transmitter 18. An on/off distress signal 20 which may comprise a switch is coupled to the signal interleaving/power conservation circuitry for changing the duty cycle of the transmitter 10 as will be explained below.

Figure 4:
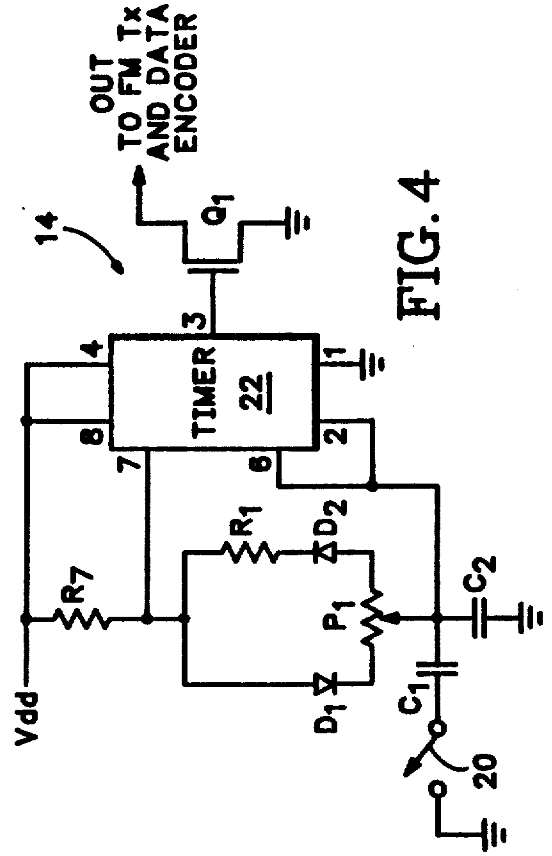
FIG. 4 is a signal interleaving and power conservation circuit for use with the transmitter of FIG. 1.

Referring to FIG. 4 the signal interleaving/power conservation circuitry 14 includes a timer 22 having pins 7 and 6 connected to a timing circuit including resistor R1, potentiometer P1, capacitors C1 and C2 and diodes D1 and D2. This circuit effectively sets the duty cycle period and, thus, the frequency with which the data signal is transmitted, by providing a clock pulse of a predetermined width to the output of transistor Q1 once every few seconds. This pulse width is determined by the setting of potentiometer Pl and capacitor C2 sets the period. A nominal duty cycle period might be five or six seconds, but this setting can be changed by the on/off distress signal switch 20 which comprises a switch that connects capacitor C1 to ground in parallel with capacitor C2. This effectively alters the duty cycle so that it is much lower. Even in a normal mode with switch 20 open, battery power is conserved because the transmitter transmits only for a brief period of time once every five or six seconds. The transmitter 18 may be any conventionally available FM transmitter that transmits in the R/C band.

Figure 3:
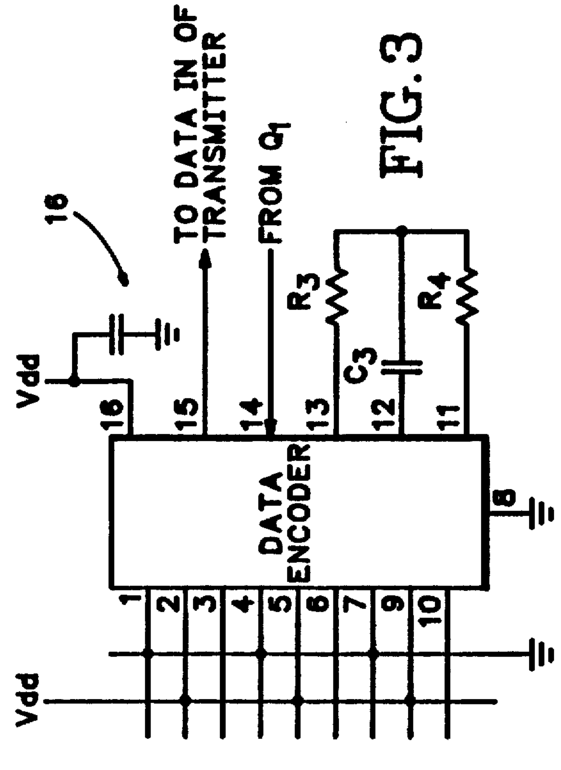
FIG. 3 is a schematic diagram of a data coder for use with the transmitter of FIG. 1.

The data that is transmitted is provided by the data encoder 16 (refer to FIG. 3) whose frequency of operation is determined by resistors R3, R4 and capacitor C3. According to the preferred embodiment, this encoder operates at 3000 Hz transmitting a 40 ms data pulse. The encoder 16 is pulsed by the output of the timing circuit 14 at the same time that the transmitter 18 is enabled by the same output. At this time the transmitter 18 transmits the encoded data signal. Interference between adjacent transmitters is statistically unlikely because the low duty cycle has the effect of interleaving data signals from such transmitters. The odds that any transmitter would be in synchronization with any other transmitter are extremely low. For this reason multiple receiver/transmitters may be operated in a given location without interference.

Figure 2:
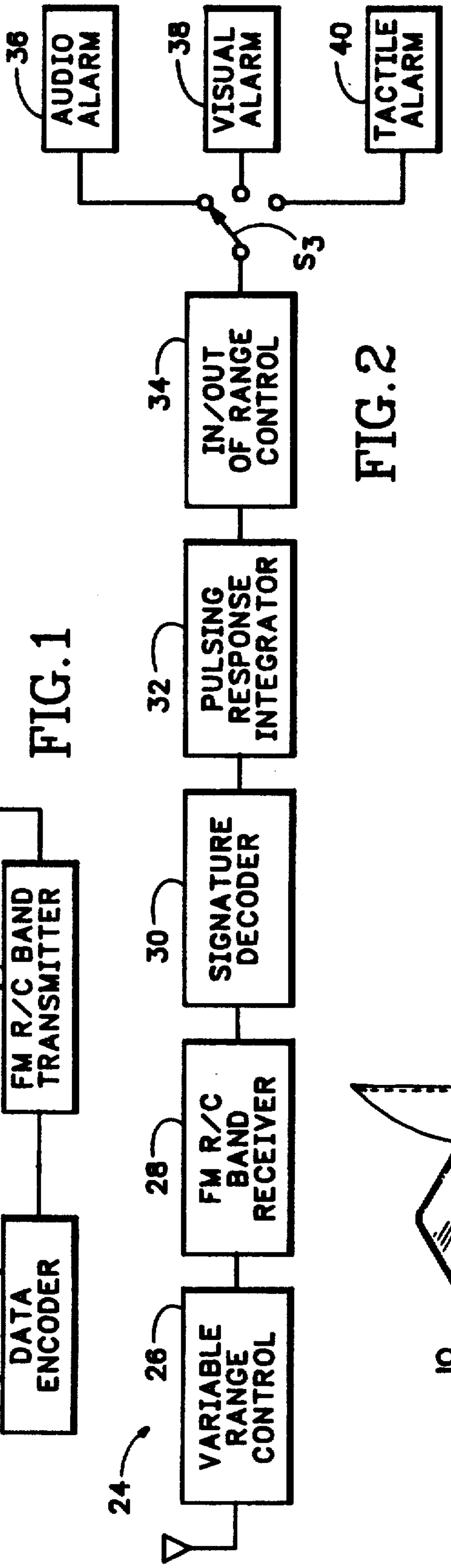
FIG. 2 is a block schematic diagram of a receiver which forms a part of the present invention.

A receiver 24 (refer to FIG. 2) includes a variable range control 26 connected to an FM R/C band receiver 28. A data decoder 30 is coupled to the output of the FM receiver 28 and the output of the decoder 30 is connected to a pulsing response integrator circuit 32. The output of integrator circuit 32 is connected to an in/out of range control 34 whose output may be coupled to one of a plurality of alarm circuits including an audio alarm 36, a visual alarm 38 or a tactile alarm 40.

Figure 7:
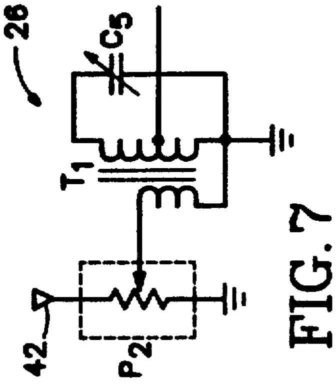
FIG. 7 is a schematic diagram of a variable range control for the receiver of FIG. 2.

The variable range control 26 is shown in FIG. 7 and comprises a potentiometer P2 which provides loading for an antenna 42. The output of potentiometer P2 is coupled to a transformer T1 and a variable capacitor C5. By increasing the load resistance of the potentiometer P2, the effective range of the receiver-transmitter combination may be altered. Knowing the maximum range of the transmitter, the potentiometer P2 may comprise a dial on the receiver which may be calibrated in meters or other units of measurement so that the desired range of the system, which may be changed at will, will be known at all times. This is especially helpful when using the system to track a person who has become lost. Other types of sensitivity controls such as a class C amplifier with a swamped emitter may also be used, as such variations are well known to those skilled in the art.

Figure 5:
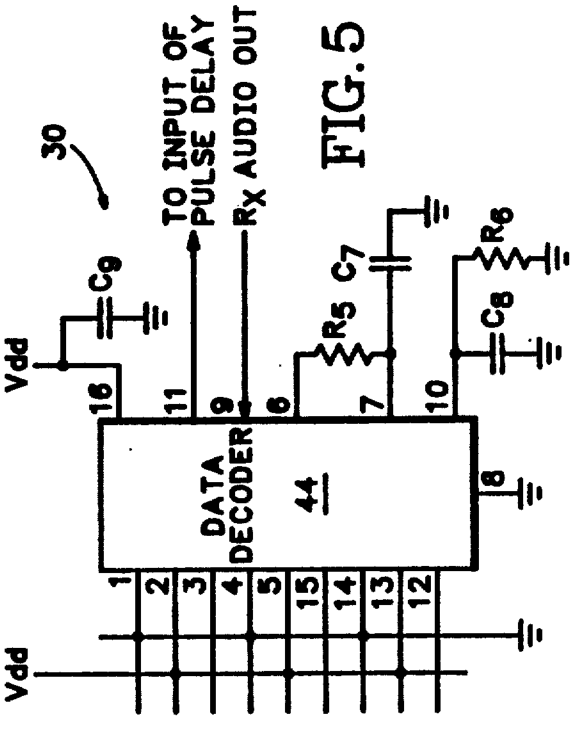
FIG. 5 is a data decoder for use with the receiver of FIG. 2.
Figure 6:
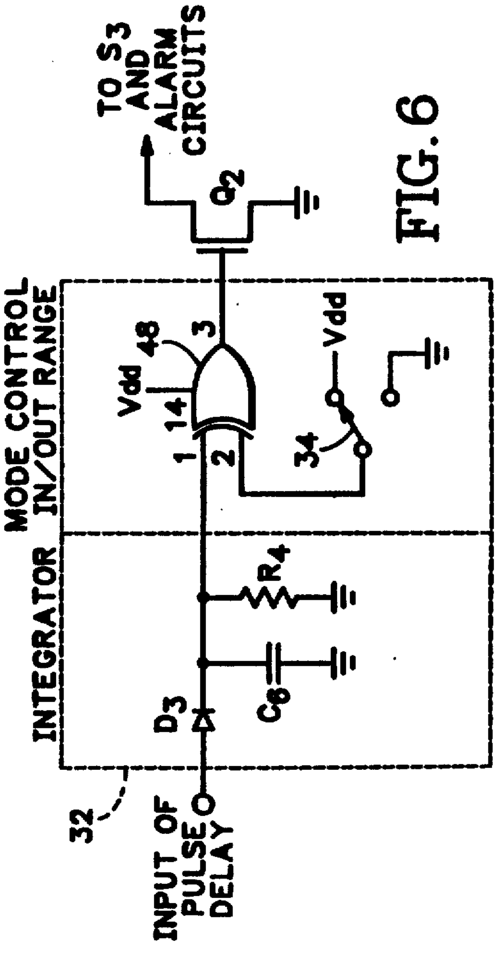
FIG. 6 is a schematic diagram of a time delay/integrator circuit and mode control circuit for use with the receiver of FIG. 2.

The FM R/C band receiver 28 may be any conventional FM receiver. The demodulated output of the receiver appears at pin 9 of an IC 44 (refer to FIG. 5). Whenever the data on pin 9 matches the code which is set on pins 1-5 and 12-15 of the IC 44, a pulse is provided at pin 11 which is connected to the input of pulsing response integrator 32. This circuit includes diode D3, capacitor C6 and resistor R4. The time constant of circuit 32 is set to be at least as long as the duty cycle period of the signal interleaving circuitry 14. Thus, in the preferred embodiment, the time constant provides a pulse delay that equals five or six seconds. This keeps the input to XOR gate 48 high as long as pulses are generated from IC 44 within the duty cycle period of the transmitter 10. The delayed pulse is provided as one input (pin 1) to XOR gate 48 whose other input (pin 2) is connected to a switch 34. In the out-of-range mode, switch 34 is coupled to Vdd as shown in FIG. 6. When the subject is in-range pins 1 and 2 of XOR gate 48 are high and transistor Q2 is off. If the subject goes out-of-range, pin 1 goes low and pin 3 goes high turning on Q2. In the in-range mode the operation is reversed. With pin 2 of XOR gate 48 grounded pin 3 will go high only if pin 1 goes high. This will occur only if the subject is in-range.

In actual use a battery is loaded into the transmitter 10 and the receiver is placed in the monitoring mode. The perimeter is set by adjusting the variable range control 26. In the monitoring mode no alarm will be generated until the subject moves beyond the perimeter. Once there is movement beyond the perimeter the alarm goes off. The suer may then enter a tracking mode where the in/out of range control 34 is changed to the in-range mode by walking in various directions, the user of the receiver 24 can determine the direction of the subject by seeing which direction of travel first produces an "in-range" alarm. Once the subject is in range, the receiver can then switch to the monitoring mode and the user can continue the search. The alarm will then go off each time the receiver moves outside the range perimeter and away from the subject. In this manner, a process of elimination will quickly provide the user with the direction of the subject. In either mode, the distance to the subject can also be determined by adjusting the variable range control while the subject is in range. Thus through a combination of mode switching and effective range adjustment, the subject may be quickly located.

Figure 8:
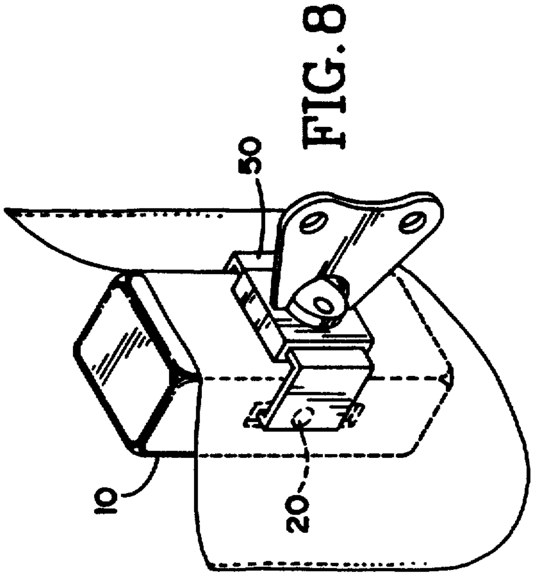
FIG. 8 is a perspective view of a transmitter affixed to the clothing of a subject with a clamp.

In actual use the transmitter 10 is attached to the clothing of the chile to be monitored by a clamp or clip 50 which also functions to depress the distress signal switch 20. If the transmitter becomes removed, the switch 20 latches into a closed position (see FIG. 8) effectively placing capacitor C1 in the circuit and lengthening the period of the timer 22. In this way the user of the receiver 24 will be able to tell if the transmitter 10 is still with the child. The switch 20 may take various forms. For example, a switch may be held in a depressed position where it is normally open when pressure is applied from a clamp which attaches the transmitter to the child's clothing. If the clamp comes loose or is removed, the switch may spring to a latched, closed position. Similar types of arrangements could be made with contacts that pierce the clothing and join two points of the circuit together, whereby removal of the conductor creates an open circuit. In such a case the circuit of FIG. 4 would have to be modified somewhat but such variations are known to those skilled in the art.

In the monitoring mode the time constant of integrator 32 maintains the alarm circuit in an OFF condition as long as the subject is within range. However, if the transmitter is removed from the subject causing the switch 20 to latch, the duty cycle is lowered thus permitting the alarm to turn on periodically even when the subject remains within range. Conversely, when the transmitter which has been removed from the subject comes into range in the tracking mode the alarm will begin to turn on periodically but will not remain on because the integrator's time constant will time out before the receipt of another pulse from the transmitter. This difference, between a steady state alarm and a periodic alarm, alerts the user that the transmitter has been removed from the subject.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A mobile perimeter monitoring system comprising:

(a) a mobile transmitter having a predetermined transmitting range for transmitting a data signal;

(b) a receiver including an alarm circuit for providing an alarm signal; and (c) mode switch means associated with said receiver for placing said receiver in a monitoring mode wherein an alarm signal will be provided only whenever said mobile transmitter moves beyond said predetermined range, and in a tracking mode wherein an alarm signal will be provided only when said mobile transmitter moves within said predetermined range.

2. The mobile perimeter monitoring system of claim 1 wherein said mobile transmitter transmits a data signal having a predetermined duty cycle period and said receiver includes delay means for delaying received data signals for a period of time sufficient to maintain said alarm circuit in a predetermined state as long as said data signal is received by said receiver within said duty cycle period.

3. The mobile perimeter monitoring system of claim 2 further including switch means associated with said mobile transmitter for altering the duty cycle of said transmitter.

4. The mobile perimeter monitoring system of claim 2 wherein said mobile transmitter includes an encoder for providing a uniquely coded data signal and wherein said receiver includes a decoder responsive to said uniquely coded data signals.

5. The mobile perimeter monitoring system of claim 1 wherein said data signal has a low duty cycle.

6. A mobile perimeter monitoring system comprising:

(a) a mobile transmitter having a predetermined transmitting range for transmitting data signals at a predetermined duty cycle;

(b) a receiver including an alarm circuit for providing an alarm signal in response to said data signals, said receiver having timing means for maintaining said alarm circuit in a first condition in response to said data signals;

(c) switch means located on said transmitter for altering the duty cycle at which said data signals are transmitted, whereby said alarm circuit will be maintained by said timing means in a second condition in response to said data signals; and (d) mode switch means for placing said receiver in a monitoring mode wherein said alarm signal will be provided only whenever said mobile transmitter moves beyond said predetermined transmitting range and in a tracking mode wherein said alarm signal will be provided only when said mobile transmitter moves within said predetermined transmitting range.

* * * * *

UNITED STATES PATENT AND TRADEMARK OFFICE

CERTIFICATE OF CORRECTION

PATENT NO. : 5,086,290

DATED : February 4, 1992

INVENTOR(S) : Shawn G. Murray et al

It is certified that error appears in the above-indentified patent and that said Letters Patent is hereby corrected as shown below:

Col. 2, Line 9: after range delete "a" insert --or--

Col. 2, Line 66: after readily insert --understood upon consideration of the following detailed--

Col. 4, Line 60: after The delete "suer" insert --user--

Col. 5, Line 10: delete "chile" insert --child--

Signed and Sealed this

Fourteenth Day of September, 1993

Attest:

BRUCE LEHMAN

*Attesting Officer*

*Commissioner of Patents and Trademarks*